United States Patent
Song et al.

(10) Patent No.: US 11,865,520 B2
(45) Date of Patent: Jan. 9, 2024

(54) STABLE CERIUM-ZIRCONIUM SOLID SOLUTION AND PREPARATION METHOD THEREFOR AND APPLICATION THEREOF

(71) Applicant: SHANDONG SINOCERA FUNCTIONAL MATERIALCO., LTD, Shandong (CN)

(72) Inventors: Xibin Song, Shandong (CN); Bing Zhang, Shandong (CN); Xi Zhang, Shandong (CN)

(73) Assignee: SHANDONG SINOCERA FUNCTIONAL MATERIAL CO., LTD, Shandong (CN)

( * ) Notice: Subject to any disclaimer, the term of this patent is extended or adjusted under 35 U.S.C. 154(b) by 75 days.

(21) Appl. No.: 17/040,884

(22) PCT Filed: Aug. 27, 2019

(86) PCT No.: PCT/CN2019/102760
§ 371 (c)(1),
(2) Date: Sep. 23, 2020

(87) PCT Pub. No.: WO2021/026964
PCT Pub. Date: Feb. 18, 2021

(65) Prior Publication Data
US 2022/0212172 A1 Jul. 7, 2022

(30) Foreign Application Priority Data
Aug. 9, 2019 (CN) .......................... 201910735653.7

(51) Int. Cl.
*B01J 23/63* (2006.01)
*B01J 35/10* (2006.01)
*B01D 53/86* (2006.01)

(52) U.S. Cl.
CPC ............ *B01J 23/63* (2013.01); *B01D 53/864* (2013.01); *B01D 53/8628* (2013.01); *B01D 53/8668* (2013.01); *B01J 35/1014* (2013.01)

(58) Field of Classification Search
CPC ........ B01J 23/63; B01J 35/1014; B01J 23/10; B01J 37/08; B01D 53/8628; B01D 53/864; B01D 53/8668; B01D 53/94; B01D 2255/2065; B01D 2255/20715; B01D 2255/206; B01D 2255/407; B01D 2258/012

See application file for complete search history.

(56) References Cited

U.S. PATENT DOCUMENTS 7,943,104 B2  5/2011  Kozlov et al.

FOREIGN PATENT DOCUMENTS

| CN | 102247826 A | | 11/2011 | |
|---|---|---|---|---|
| CN | 102 513 085 A | * | 6/2012 | ............. Y02A 50/20 |
| CN | 102513085 A | | 6/2012 | |
| CN | 103127925 A | | 6/2013 | |
| CN | 110026177 A | | 7/2019 | |
| CN | 110026179 A | | 7/2019 | |
| JP | H09221304 A | | 8/1997 | |
| JP | 2011218297 A | | 11/2011 | |

OTHER PUBLICATIONS

Galtayries et al., "XPS comparative study of ceria/zirconia mixed oxides: powders and thin film characterisation" Journal of Electron Spectroscopy and Related Phenomena, vol. 88-91 (Mar. 1, 1998): pp. 951-956.
Search Report issued in European Patent Application No. 19916539.0; Application Filing Date Aug. 27, 2019; dated Jun. 27, 2022 (8 pages).

* cited by examiner

*Primary Examiner* — Timothy C Vanoy
(74) *Attorney, Agent, or Firm* — CANTOR COLBURN LLP

(57) ABSTRACT

Disclosed are a cerium-zirconium solid solution and a preparation method therefor and an application thereof, which belong to the field of adsorbing catalyst materials. The cerium-zirconium solid solution includes a cerium-zirconium solid solution phase with a $Ce^{3+}/Ce^{4+}$ molar ratio of 0.05-0.8:1. The cerium-zirconium solid solution phase in the cerium-zirconium solid solution of the present application includes trivalent cerium ions and tetravalent cerium ions in a specific ratio. The cerium-zirconium solid solution has a high oxygen storage and release rate, a high oxygen storage and release capacity, and the cerium-zirconium solid solution during the storage and release of oxygen has a stable structure and good catalytic performance; and the catalyst containing the cerium-zirconium solid solution has good catalytic performance under different fuel ratios.

15 Claims, 3 Drawing Sheets

STABLE CERIUM-ZIRCONIUM SOLID SOLUTION AND PREPARATION METHOD THEREFOR AND APPLICATION THEREOF

This application is a National Phase of PCT Application No. PCT/CN2019/102760 filed Aug. 27, 2019 which claims priority to Chinese Application No. 201910735653.7 filed on Aug. 9, 2019, entitled "STABLE CERIUM-ZIRCONIUM SOLID SOLUTION AND PREPARATION METHOD THEREFOR AND APPLICATION THEREOF", which is incorporated herein by reference in its entirety.

TECHNICAL FIELD

The present application relates to a cerium-zirconium solid solution and a preparation method therefor and an application thereof, and belongs to the field of adsorption catalyst materials.

BACKGROUND

Cerium-zirconium composite oxides are widely used in the field of mobile source catalysis due to their excellent oxygen storage and release performance and good aging performance. In addition to participating in catalytic reactions, the cerium-zirconium composite oxide also has the function of a carrier and plays a supporting and dispersing role on active metals. The formula change of the cerium-zirconium composite oxide has obvious influence on its physical and chemical properties and application properties. The molar ratio change of the cerium-zirconium composite oxide may affect its reduction temperature, oxygen storage performance and high temperature aging performance, thereby affecting the cold start catalytic performance of the catalytic application end of the mobile source and the utilization efficiency of precious metals.

However, in the tail gas catalytic reactions, the three-way catalysts must achieve both the reduction of nitrogen oxides and the oxidation of the remaining carbon monoxide and hydrocarbons that have not been completely burned. To achieve the highest conversion rate of these three types of pollutants, the oxygen content in a fuel reaction system must be close to the theoretical reaction measurement point relative to the fuel. Only in the vicinity of the theoretical air-fuel ratio, the three-way catalysts can achieve the maximum conversion of the three types of pollutants of nitrogen oxides, carbon monoxide and hydrocarbons. Definition of air-fuel ratio (A/F): the mass of air consumed by the engine/the mass of fuel consumed by the engine. When A/F=14.6 ($\lambda$=1), the fuel can be completely burned theoretically, and the tail gas discharged after combustion can achieve the maximum conversion of pollutants by the residual oxidizing substances in the tail gas under the action of the catalyst. Control of the fuel ratio is automatically controlled by a sensor closed-loop system.

But in the actual driving process, due to the complicated working conditions, the inhaled oxygen sometimes is insufficient and sometimes is excessive compared to the oil and gas injected into the cylinder. When oil and gas are excessive ($\lambda$>1), the tail gas may contain excessive hydrocarbons and carbon monoxide that need to be burned catalytically, but lack of oxygen in the tail gas prevents it from being converted; when air is excessive ($\lambda$<1), the tail gas contains excessive oxygen, resulting in a large amount of nitrogen oxides. The reduction of nitrogen oxides to nitrogen mainly depends on hydrocarbons and carbon monoxide. Due to excessive oxygen, hydrocarbons and carbon monoxide will be largely catalyzed by the catalyst, making it difficult to reduce nitrogen oxides, which causes the nitrogen oxides in the tail gas to exceed the standard.

Cerium oxide in a cerium-zirconium solid solution has two valence states: trivalent and tetravalent, which can be freely converted under certain conditions. When there is too much air in the exhaust gas, trivalent cerium absorbs oxygen and stores it, and at the same time converts into tetravalent cerium, thereby ensuring the reduction of nitrogen oxides; when there is a lack of oxygen in the tail gas, tetravalent cerium will release oxygen to ensure the full oxidation of hydrocarbons and carbon monoxide.

However, the mutual conversion of trivalent cerium and tetravalent cerium is a dynamic equilibrium problem. The conversion of trivalent cerium to tetravalent cerium reduces the atomic radius, which leads to lattice shrinkage of the solid solution; the conversion of tetravalent cerium to trivalent cerium increases the atomic radius, which leads to lattice expansion of the cerium-zirconium solid solution; both the shrinkage and expansion of the lattice may lead to the instability of the structure of the cerium-zirconium solid solution, thereby leading to agglomeration or collapse of the pore channels, and affecting the catalyst life and catalytic activity.

SUMMARY

In order to solve the above problems, provided are a cerium-zirconium solid solution and a preparation method therefor and an application thereof. The cerium-zirconium solid solution phase in the cerium-zirconium solid solution includes trivalent cerium ions and tetravalent cerium ions in a specific ratio. The cerium-zirconium solid solution has a high oxygen storage and release rate, a high oxygen storage and release capacity, and the cerium-zirconium solid solution during the storage and release of oxygen has a stable structure; the preparation method for the cerium-zirconium solid solution is simple and easy to control. The obtained cerium-zirconium solid solution has a high specific surface area and a high specific surface area after aging at 1100° C., a high oxygen storage capacity, and the cerium-zirconium solid solution during the storage and release of oxygen has a stable structure; the cerium-zirconium solid solution has a high efficiency, a stable structure and a long service life for catalyzing oxidizing/reducing gases as a catalyst, thereby the cost of using the catalyst is low.

According to an aspect of the present application, provided is a cerium-zirconium solid solution, and the cerium-zirconium solid solution phase in the cerium-zirconium solid solution includes trivalent cerium ions and tetravalent cerium ions in a specific ratio, which can not only ensure the oxygen storage and release rate, but also can realize the oxygen storage and release capacity, and can also ensure the structure stability of the cerium-zirconium solid solution.

The cerium-zirconium solid solution includes a cerium-zirconium solid solution phase, wherein the cerium-zirconium solid solution phase comprises trivalent cerium ions and tetravalent cerium ions with a $Ce^{3+}/Ce^{4+}$ molar ratio of 0.05-0.8:1.

Optionally, the $Ce^{3+}/Ce^{4+}$ molar ratio is 0.1-0.5:1. Further, the lower limit of the range of $Ce^{3+}/Ce^{4+}$ molar ratio is selected from 0.15:1, 0.2:1, 0.25:1, 0.3:1, 0.35:1, 0.4:1, or 0.45:1, and the upper limit is selected from 0.15:1, 0.2:1, 0.025:1, 0.3:1, 0.35:1, 0.4:1 or 0.45:1. Further, the $Ce^{3+}/Ce^{4+}$ molar ratio is 0.15-0.5:1. Furthermore, the $Ce^{3+}/Ce^{4+}$ molar ratio is 0.16-0.5:1.

Optionally, the cerium-zirconium solid solution comprises a cerium oxide, $ZrO_2$, and a first rare earth element oxide in a weight ratio of 20-50:20-80:2-20;

wherein the first rare earth element is selected from at least one of rare earth elements other than cerium, transition metal elements, and alkaline earth metal elements.

and preferably, the first rare earth element is selected from at least one of lanthanum, yttrium, praseodymium, neodymium, and samarium.

Further, the cerium-zirconium solid solution phase includes $CeO_2$, $ZrO_2$, $La_2O_3$, and $Y_2O_3$ in a weight ratio of 30-50:40-60:3-7:3-7. As an embodiment, the composition of the cerium-zirconium solid solution phase includes 40 wt % $CeO_2$, 50 wt % $ZrO_2$, 5% $La_2O_3$, and 5 wt % $Y_2O_3$.

Optionally, the cerium-zirconium solid solution further comprises a second rare earth element oxide, the weight ratio of the cerium oxide to the second rare earth oxide being 20-50:2-5;

wherein the second rare earth element is selected from at least one of promethium, samarium, europium, gadolinium, terbium, dysprosium, holmium, erbium, thulium, ytterbium, lutetium, and scandium; wherein the second rare earth element is selected from at least one of rare earth elements other than cerium, transition metal elements, and alkaline earth metal elements.

Optionally, the cerium-zirconium solid solution comprises a cerium oxide, $ZrO_2$, a first rare earth element oxide, and a second rare earth element oxide in a weight ratio of 25-45:30-70:3-15:2-4.

Further, the cerium-zirconium solid solution phase includes $CeO_2$, $ZrO_2$, $La_2O_3$, and $Pr_6O_1$ in a weight ratio of 10-30:50-75:1-5:4.5-17. As an embodiment, the composition of the cerium-zirconium solid solution includes 20 wt % $CeO_2$, 73 wt % $ZrO_2$, 2 wt % $La_2O_3$ and 5 wt % $Pr_6O_{11}$.

Optionally, after heat treatment at 750° C. for 4 hours, an oxygen storage capacity of the cerium-zirconium solid solution is not less than 540 μmol [O]/g; and/or the specific surface area of the cerium-zirconium solid solution treated at 1100° C. for 4 hours is not less than 30 $m^2/g$.

Preferably, after heat treatment at 750° C. for 4 hours, an oxygen storage capacity of the cerium-zirconium solid solution is greater than 600 μmol [O]/g; and/or the specific surface area of the cerium-zirconium solid solution treated at 1100° C. for 4 hours is greater than 35 $m^2/g$.

According to another aspect of the present application, provided is a preparation method for a cerium-zirconium solid solution. The preparation method for a cerium-zirconium solid solution is simple and easy to control. The obtained cerium-zirconium solid solution has a high specific surface area and a high specific surface area after aging at 1100° C., a high oxygen storage and release rate, a high oxygen storage and release capacity, and the cerium-zirconium solid solution during the storage and release of oxygen has a stable structure.

The preparation method for a cerium-zirconium solid solution comprises the following steps:

1) Mixing: preparing an initial mixture of an aqueous solution containing trivalent cerium ions and zirconium ions;
2) Oxidation reaction: adding hydrogen peroxide to the acidic initial mixture according to a required amount of trivalent cerium ions and tetravalent cerium ions, and adding a precipitant to adjust pH of the solution to 10-11 to obtain a precursor solution;

3) A first hydrothermal reaction: after a first hydrothermal reaction, calcining the precursor solution in an inert gas to obtain the cerium-zirconium solid solution.

Optionally, the precipitant is selected from at least one of aqueous ammonia, sodium hydroxide, amines and urea. Preferably, the precipitant is selected from aqueous ammonia or urea. Preferably, the precipitant is aqueous ammonia.

Optionally, the trivalent cerium ions, tetravalent zirconium ions and M ions in the raw materials for preparing the initial mixture are selected from at least one of nitrate, phosphate, sulfate, acetate, oxalate, chloride and carbonate. Preferably, the trivalent cerium ions and tetravalent zirconium ions in the raw materials for preparing the initial mixture are selected from cerium nitrate and zirconyl nitrate.

Preferably, the mixing in the step 1) comprises the step of: preparing an initial mixture of an aqueous solution containing trivalent cerium ions, tetravalent zirconium ions and M ions. Wherein the M element is selected from at least one of rare earth elements other than cerium, transition metal elements, and alkaline earth metal elements.

preferably, the oxidation reaction in the step 2) comprises the following steps:

① adding an alkaline precipitant to the initial mixture until the pH of the solution is 1.0-2.5; adding 30% of an aqueous solution of hydrogen peroxide to the initial mixture according to the amount of trivalent cerium ions and tetravalent cerium ions, and stirring at least 1 hour for a second hydrothermal reaction; and ② adding a precipitant to adjust the pH of the solution to 10-11, and aging the solution for at least 1 hour to obtain the precursor solution.

Preferably, adding an alkaline precipitant to the initial mixture until the pH of the solution is 1.5-2.0.

Preferably, after adding a hydrogen peroxide aqueous solution, stirring is carried out for 2-3 hours.

Optionally, the temperature of the second hydrothermal reaction is 150-220° C., and the time is 15-20 hours.

Optionally, the temperature of the first hydrothermal reaction is 180-220° C., and the time is 10-20 hours.

Preferably, in the step ②, the precipitation agent is added to adjust the pH of the solution to 8.5-9.5.

Preferably, in the step ②, aging is carried out for 3-4 hours.

Optionally, the temperature of the first hydrothermal reaction is 180-220° C., and the time is 10-20 hours.

Preferably, a calcining condition in the step 3) is calcining in an inert gas at 750° C.-850° C. for 4 hours. Preferably, the inert gas is selected from at least one of nitrogen, argon and helium.

Optionally, the cerium-zirconium solid solution comprises 20 wt %-50 wt % cerium oxide and 20 wt %-80 wt % $ZrO_2$, and the cerium oxide comprises trivalent cerium ions and tetravalent cerium ions in a molar ratio of 0.05-0.8:1.

Optionally, the cerium-zirconium solid solution comprises 30 wt %-50 wt % cerium oxide and 40 wt %-50 wt % $ZrO_2$, and the cerium oxide comprises trivalent cerium ions and tetravalent cerium ions in a molar ratio of 0.15-0.5:1. Furthermore, the cerium oxide comprises trivalent cerium ions and tetravalent cerium ions in a molar ratio of 0.16-0.5:1.

According to yet another aspect of the present application, provided is a catalyst, in which the cerium-zirconium solid solution has a high efficiency, a stable structure and a long service life for catalyzing the oxidizing/reducing gases as a catalyst, thereby the cost of using the catalyst is low.

The catalyst comprises a cerium-zirconium solid solution, wherein the cerium-zirconium solid solution is selected from:

the cerium-zirconium solid solution as described above or the cerium-zirconium solid solution prepared by the method described above, or the cerium-zirconium solid solution as described above calcined at 500-1200° C. for at least 1 hour or, the cerium-zirconium solid solution prepared by the method as described above calcined at 500-1200° C. for at least 1 hour.

According to still another aspect of the present application, provided is an application of a catalyst, which includes the application of the cerium-zirconium solid solution or the catalyst, wherein the application is selected from any one of I or II:

I. an application in catalytic conversion of one or more gases selected from $CH_4$, $C_3H_8$, $C_2H_6$, $NO_2$, NO, CO, $H_2O$ or $CO_2$;

II. an application in mobile source tail gas, waste gas treatment, natural gas catalytic combustion, organic waste gas purification or industrial waste gas denitration treatment. The mobile source tail gas includes motor vehicle tail gas purification.

In the application, the metals Zr and M other than cerium in the cerium-zirconium solid solution are both at the highest and most stable positive valence state. The valence states of the raw materials of Zr and M are not limited. If a low valence state with reducibility needs to add the corresponding amount of oxidation when adding hydrogen peroxide, preferably the raw materials of Zr and M are both at the highest and most stable positive valence state.

The beneficial effects of the present application include, but are not limited to:

1. The cerium-zirconium solid solution phase in the cerium-zirconium solid solution of the present application, which includes trivalent cerium ions and tetravalent cerium ions in a specific ratio. The cerium-zirconium solid solution has a high oxygen storage and release rate, a high oxygen storage and release capacity, and the cerium-zirconium solid solution during the storage and release of oxygen has a stable structure and good catalytic performance.

2. The preparation method for a cerium-zirconium solid solution according to the present application is simple and easy to control. The obtained cerium-zirconium solid solution has a high specific surface area and a high specific surface area after aging at 1100° C., a high oxygen storage and release rate, a high oxygen storage and release capacity, and the cerium-zirconium solid solution during the storage and release of oxygen has a stable structure.

3. The catalyst according to the present application, in which the cerium-zirconium solid solution as a catalyst catalyzes oxidizing/reducing gas with high efficiency, good catalytic performance at different fuel ratios, stable structure and long service life, thereby the cost of using the catalyst is low.

4. The application of the catalyst according to the present application, the catalyst is used to catalyze oxidizing/reducing gas. The catalyst may catalyze gas with oxidizability and reducibility, and there are many types of gas used; and its stable catalytic performance at high temperature has many practical application scenarios.

BRIEF DESCRIPTION OF FIGURES

The drawings described herein are used to provide a further understanding of the present application and form a part of the present application. The schematic embodiments and descriptions of the present application are used to explain the present application and do not constitute an undue limitation on the present application. In the drawings.

DETAILED DESCRIPTION

Figure 1:
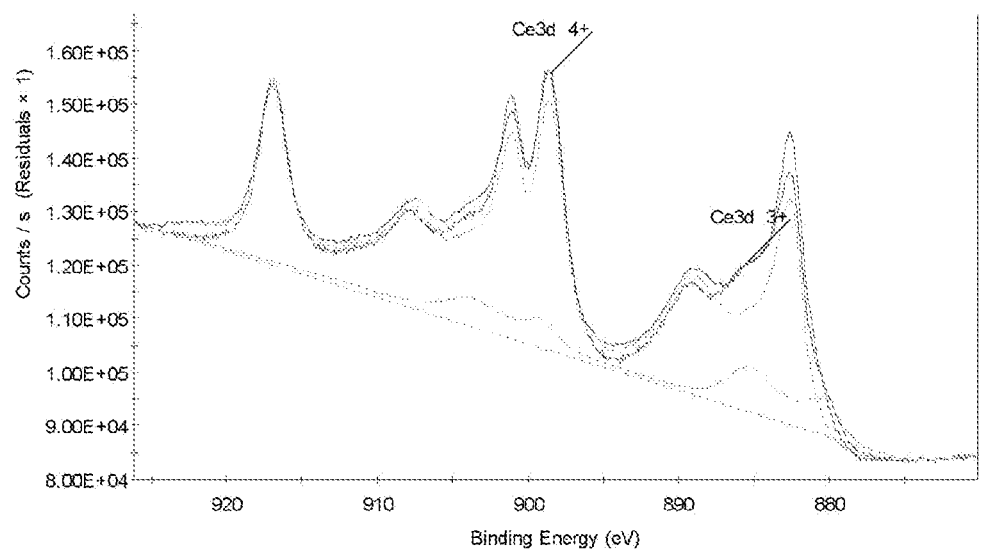
FIG. 1 is the XPS spectrum of cerium-zirconium solid solution 1 #-1.

The present application will be described in detail below with reference to examples, but the present application is not limited to these examples.

Unless otherwise specified, the raw materials and catalysts in the examples of the present application are purchased through commercial channels.

The analysis methods in the examples of the present application are as follows:

1. The instrument for detecting $Ce^{3+}/Ce^{4+}$ is the kratos-ultra DLD X-ray photoelectron spectrometer of Shimadzu Corporation.

2. Micromeritics TriStar II automatic adsorption instrument of Micromeritics Corporation is used to analyze the specific surface of the cerium-zirconium solid solution.

3. ChemBET-3000 instrument of Quantachrome Corporation is used to analyze the oxygen storage capacity of the cerium-zirconium solid solution.

4. The catalyst evaluation instrument is Haina Chenke, HN-CK-21 infrared flue gas analyzer;

The catalytic evaluation adopts a method of simulating tail gas, and the air-fuel ratio λ is defined as: $\lambda=(2V_{NO2}+2.5V_{O2})/(2V_{CO}+V_{C2H6})$, and V represents the final volume percentage of a mixed gas flowing through a catalyst bed; the carrier gas is Ar; the loading amount of the catalyst is 0.3 g, 40-60 mesh; the mass space velocity is 40000 $h^{-1}$, and the test point temperature is 400° C.;

By controlling the percentage of gas, points around a theoretical air-fuel ratio of 1 are fluctuatedly taken to detect the effect of different $Ce^{3+}/Ce^{4+}$ ratios on catalytic reactions under different air-fuel ratios, and the value of k is: 0.9, 0.95, 1.0, 1.05, 1.10.

According to an embodiment of the present application, the preparation method for a cerium-zirconium solid solution includes the following steps:

1) mixing: preparing trivalent cerium ions, tetravalent zirconium ions and other rare earth elements to obtain a clear aqueous solution as an initial mixture;

2) Oxidation reaction:

① Stirring the solution at a certain water bath temperature until it is clear, and adding an alkaline precipitant dropwise while stirring until the pH of the solution is 1.0-2.5, preferably 1.5-2.0; adding a certain amount of hydrogen peroxide with a mass concentration of 30% after the pH adjustment, and continuing to stir for 2-3 hours; introducing the solution into an autoclave and performing the hydrothermal reaction at 150-220° C. for 15-20 hours;

② Adding a basic precipitation agent dropwise at a certain speed to the material after the second hydrothermal reaction until the pH is 8.0-10.0, preferably 8.5-9.5; aging the material after the pH adjustment at a certain water bath temperature for 3-4 hours;

3) A first hydrothermal reaction: introducing the aged material into an autoclave, and performing the hydrothermal reaction at 180-220° C. for 10-20 hours; washing and drying the product after the reaction, and heat-treating under an inert atmosphere at 750° C.-850° C. for 4 hours to obtain a final product.

Example 1 Preparation of Cerium-Zirconium Solid Solution 1-1 # of Cerium, Zirconium, Lanthanum and Yttrium Cerium-zirconium solid solution 1-1 #including cerium, zirconium, lanthanum and yttrium. The proportions of cerium oxide, zirconium oxide, lanthanum oxide, and yttrium oxide in cerium-zirconium solid solution 1 #according to the weights of the oxides are: 40 wt % cerium oxide, 50 wt % zirconium oxide, 5 wt % lanthanum oxide, 5 wt % yttrium oxide, with a total oxide concentration of 100 g/l.

The preparation method for cerium-zirconium solid solution 1 #-1 includes the following steps (the molar amount of hydrogen peroxide is 1.3 times the molar amount of $Ce^{3+}$ ions):

1) in the first beaker, 280 g of cerium nitrite corresponding to cerium oxide was dissolved in 500 mL of deionized water, and stirred for 1 hour; in the second beaker, 350 g of zirconium nitrate corresponding to zirconium oxide was added and dissolved with 1000 mL of deionized water, and stirred for 1 hour; in the third beaker, 35 g of lanthanum nitrate corresponding to lanthanum oxide and 35 g of yttrium nitrate corresponding to yttrium oxide were dissolved with 1000 mL of deionized water, and the solution was stirred until it was clear.

2) The solutions in the three beakers were mixed and stirred until they were clear, and adjusted the pH to 2.0 with aqueous ammonia under a 40° C. water bath condition. At this time, the solution was a clear solution. 239.8 g of 30% hydrogen peroxide was added and stirred for 2 hours, and no precipitation was generated. The solution was set to 7 L, and introduced into a 10 L enamel hydrothermal synthesis kettle, the top of which was sealed with nitrogen. The reaction solution was subjected to the hydrothermal reaction at 180° C. for 20 hours. The product after the hydrothermal reaction was adjusted to pH 9-10 with aqueous ammonia, and the material after the pH adjustment was continued to be aged at 40° C. water bath temperature for 3 hours.

3) The aged material was introduced into the autoclave, and subjected to the hydrothermal reaction at 180° C. for 10 hours; 300 g of lauric acid was added to the product after the reaction, stirred for 30 minutes, and then filtered with suction. The filter cake was dried at 120° C. for 5 hours, and then calcined at 750° C. for 5 hours to obtain the final product. During the drying and calcination process, all were protected with a nitrogen atmosphere to obtain cerium-zirconium solid solution 1-1 #.

Example 2 Preparation of Cerium-Zirconium Solid Solutions 1 #-2~1 #-9 of Cerium, Zirconium, Lanthanum and Yttrium According to the raw materials and preparation method for cerium-zirconium solid solution 1 #-1 of Example 1, cerium-zirconium solid solutions 1 #-2~1 #-8 were prepared by changing the molar ratio of $Ce^{3+}$ and hydrogen peroxide, respectively. The specific molar ratios of $Ce^{3+}/Ce^{4+}$ of cerium-zirconium solid solutions 1 #-1~1 #-8 and obtained cerium-zirconium solid solutions 1 #-1~1 #-8 are shown in Table 1.

According to the raw materials and preparation method for cerium-zirconium solid solution 1 #-1 of Example 1, the raw material $Ce^{3+}$ was replaced with $Ce^{4+}$, and hydrogen peroxide was not added in the step to obtain cerium-zirconium solid solution 1 #-9.

Figure 2:
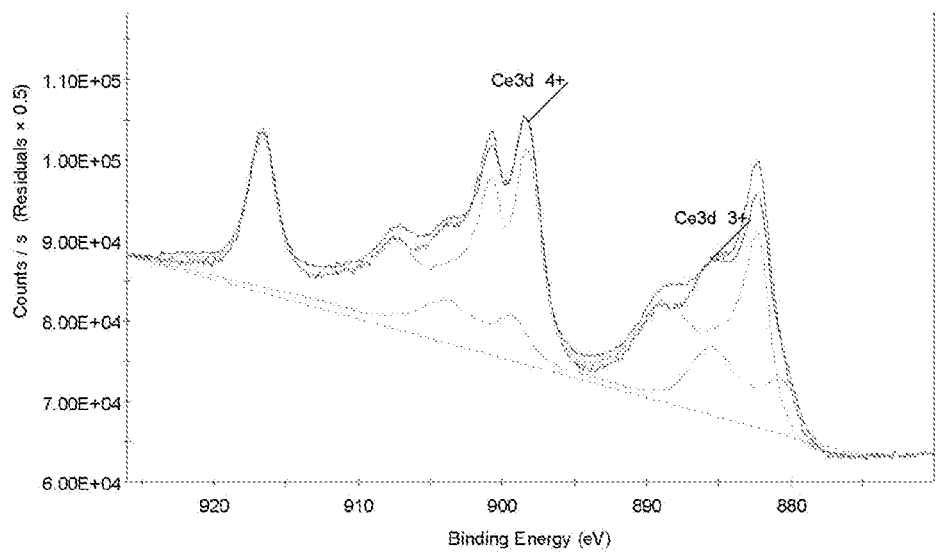
FIG. 2 is the XPS spectrum of cerium-zirconium solid solution 1 #-4.
Figure 3:
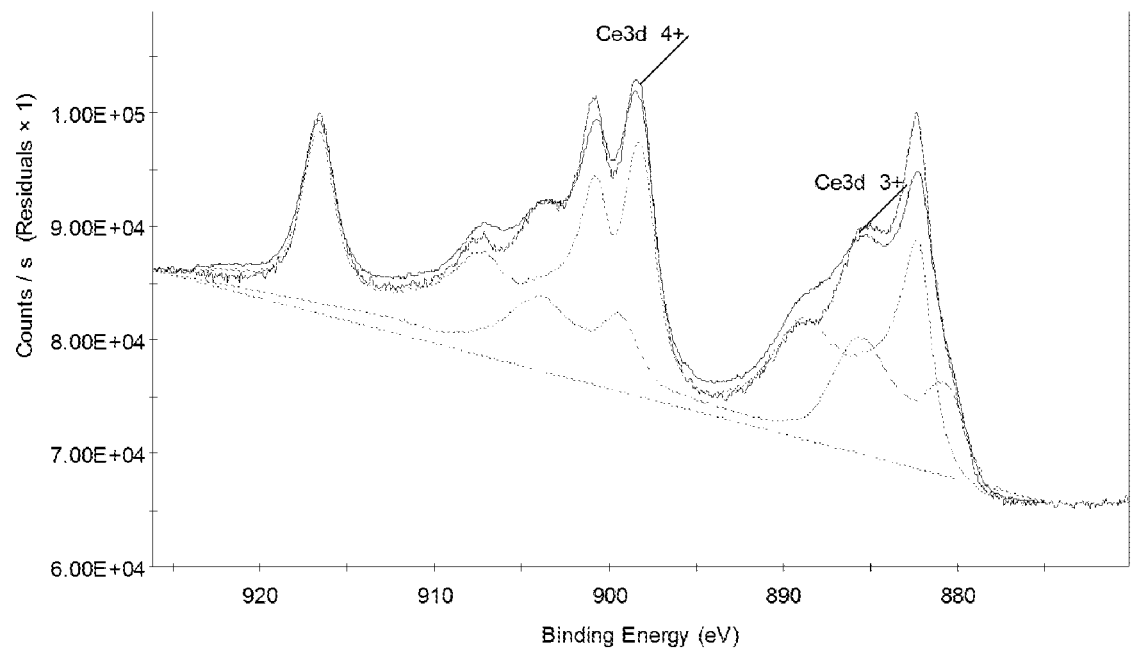
FIG. 3 is the XPS spectrum of cerium-zirconium solid solution 1 #-8.

The molar ratio of $Ce^{3+}/Ce^{4+}$ was tested using XPS, in which the XPS spectra of cerium-zirconium solid solutions 1 #-1, 1 #-4, and 1 #-8 are shown in FIG. 1, FIG. 2, and FIG. 3 as examples to illustrate the test spectrum results of $Ce^{3+}/Ce^{4+}$. It can be seen from FIGS. 1-3 that the cerium-zirconium solid solutions 1 #-1, 1 #-4, and 1 #-8 simultaneously contain $Ce^{3+}/Ce^{4+}$ and their contents.

TABLE 1

| Samples | cerium-zirconium solid solution 1#-2 | cerium-zirconium solid solution 1#-2 | cerium-zirconium solid solution 1#-3 | cerium-zirconium solid solution 1#-4 | cerium-zirconium solid solution 1#-5 | cerium-zirconium solid solution 1#-6 | cerium-zirconium solid solution 1#-7 | cerium-zirconium solid solution 1#-8 | cerium-zirconium solid solution 1#-9 |
|---|---|---|---|---|---|---|---|---|---|
| Molar ratio of hydrogen peroxide to $Ce^{3+}$ | 1.3 | 1.2 | 1.1 | 1.0 | 0.9 | 0.8 | 0.7 | 0.6 | 0 |
| Molar ratio of $Ce^{3+}/Ce^{4+}$ | 0.142 | 0.156 | 0.162 | 0.278 | 0.397 | 0.462 | 0.668 | 0.793 | 0 |

Example 3 Preparation of Cerium-Zirconium Solid Solution 2 #-1 of Cerium, Zirconium, Lanthanum and Praseodymium Cerium-zirconium solid solution 2 #-1 including cerium, zirconium, lanthanum and praseodymium. The proportions of cerium oxide, zirconium oxide, lanthanum oxide, and praseodymium oxide in cerium-zirconium solid solution 2 #-1 according to the weights of the oxides are: 20 wt % cerium oxide, 73 wt % zirconium oxide, 2 wt % lanthanum oxide, 5 wt % praseodymium oxide.

The preparation method for cerium-zirconium solid solution 2 #-1 includes the following steps (the molar amount of hydrogen peroxide is 1.3 times the molar amount of $Ce^{3+}$ ions):

1) in the first beaker, 140 g of cerium nitrite corresponding to cerium oxide was dissolved in 500 mL of deionized water, and stirred for 1 hour; in the second beaker, 511 g of zirconium nitrate corresponding to zirconium oxide was added and dissolved with 1000 mL of deionized water, and stirred for 1 hour; in the third beaker, 14 g of lanthanum nitrate corresponding to lanthanum oxide and 35 g of yttrium nitrate corresponding to yttrium oxide were dissolved with 1000 mL of deionized water, and the solution was stirred until it was clear.

2) The solutions in the three beakers were mixed and stirred until they were clear, and adjusted the pH to 2.0 with aqueous ammonia in a 40° C. water bath. At this time, the solution was a clear solution. 119.9 g of 30% hydrogen peroxide was added and stirred for 2 hours, and no precipitation was generated. The solution was set to 7 L, and introduced into a 10 L enamel hydrothermal synthesis kettle, the top of which was sealed with nitrogen. The reaction solution was subjected to the hydrothermal reaction at 180° C. for 20 hours. The product after the hydrothermal reaction was adjusted to pH 9-10 with aqueous ammonia, and the material after the pH adjustment was aged at 40° C. water bath temperature for 3 hours.

3) The aged material was introduced into the autoclave, and subjected to the hydrothermal reaction at 180° C. for 10 hours; 300 g of lauric acid was added to the product after the reaction, stirred for 30 minutes, and then filtered with suction. The filter cake was dried at 120° C. for 5 hours, and then calcined at 750° C. for 5 hours to obtain the final product. During the drying and calcination process, all were protected with a nitrogen atmosphere to obtain cerium-zirconium solid solution 2 #-1.

Example 4 Preparation of Cerium-Zirconium Solid Solutions 2 #-2~2 #-8 of Cerium, Zirconium, Lanthanum and Yttrium According to the raw materials and preparation method for cerium-zirconium solid solution 2 #-1 of Example 3, cerium-zirconium solid solutions 2 #-2~2 #-8 were prepared by changing the molar ratio of $Ce^{3+}$ and hydrogen peroxide, respectively. The specific molar ratios of $Ce^{3+}/Ce^{4+}$ of cerium-zirconium solid solutions 2 #-1~2 #-8 and obtained cerium-zirconium solid solutions 2 #-1~2 #-8 are shown in Table 2.

According to the raw materials and preparation method for cerium-zirconium solid solution 2 #-1 of Example 3, the raw material Ce' is replaced with Ce', and hydrogen peroxide was not added in the step to obtain cerium-zirconium solid solution 2 #-9.

Figure 4:
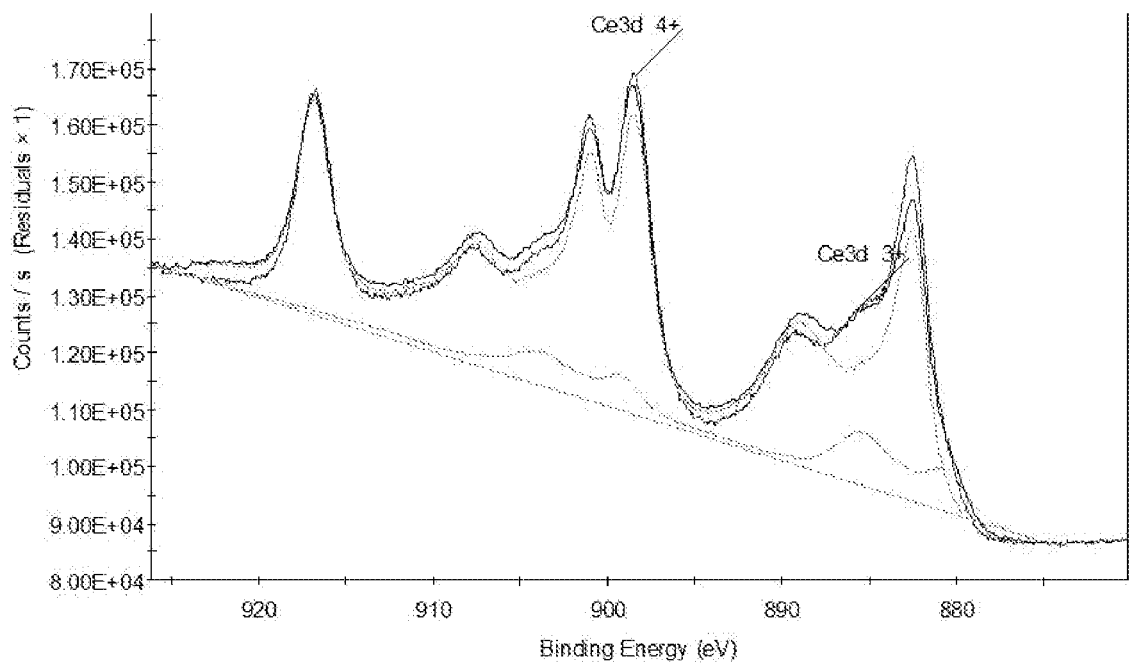
FIG. 4 is the XPS spectrum of cerium-zirconium solid solution 2 #-1.
Figure 5:
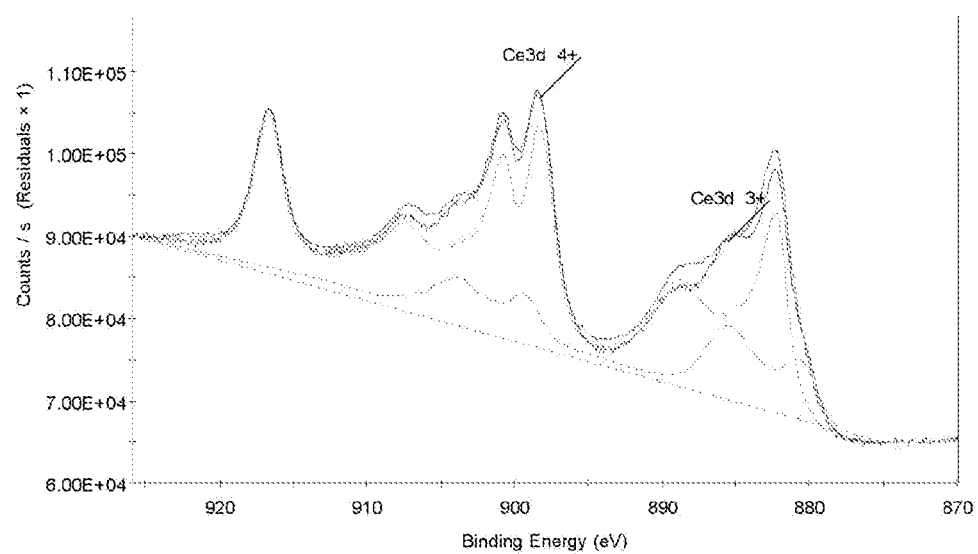
FIG. 5 is the XPS spectrum of cerium-zirconium solid solution 2 #-4.

The molar ratio of $Ce^{3+}/Ce^{4+}$ is tested using XPS, in which the XPS spectra of cerium-zirconium solid solutions 2 #-1 and 2 #-4 are shown in FIG. 4 and FIG. 5 as examples to illustrate the test spectrum results of $Ce^{3+}/Ce^{4+}$. It can be seen from FIGS. 4 and 5 that the cerium-zirconium solid solutions 2 #-1 and 2 #-4 simultaneously contain $Ce^{3+}/Ce^{4+}$ and their contents.

TABLE 2

| Samples | cerium-zirconium solid solution 2#-1; | cerium-zirconium solid solution 2#-2; | cerium-zirconium solid solution 2#-3; | cerium-zirconium solid solution 2#-4; | cerium-zirconium solid solution 2#-5; | cerium-zirconium solid solution 2#-6; | cerium-zirconium solid solution 2#-7; | cerium-zirconium solid solution 2#-8; | cerium-zirconium solid solution 2#-9; |
|---|---|---|---|---|---|---|---|---|---|
| Molar ratio of hydrogen peroxide to $Ce^{3+}$ | 1.3 | 1.2 | 1.1 | 1.0 | 0.9 | 0.8 | 0.7 | 0.6 | 0 |
| Molar ratio of $Ce^{3+}/Ce^{4+}$ | 0.139 | 0.161 | 0.172 | 0.269 | 0.406 | 0.462 | 0.650 | 0.811 | 0 |

Example 5 Specific Surface Area and Oxygen Storage Tests for Cerium-Zirconium Solid Solutions 1 #-1~1 #-9 and 2 #-1~2 #-9

The specific surface area of cerium-zirconium solutions 1 #-1~1 #-8 and 2 #-1~2 #-8 obtained in Examples 1-4, the specific surface area after aging at 1100° C. for 4 hours, the oxygen storage capacity by treatment at 750° C. for 4 hours and the oxygen storage capacity by treatment at 1100° C. for 4 hours were tested respectively, and the test results are shown in Table 3.

TABLE 3

| Test number | $Ce^{3+}/Ce^{4+}$ | Specific surface area (m²/g) | Aging specific surface area (m²/g)(1100° C.-4 h) | Oxygen storage capacity/(μmol[O]/g) (treated at 750° C.-4 h) | Oxygen storage capacity/(μmol[O]/g) (treated at 1100° C.-4 h) |
|---|---|---|---|---|---|
| cerium-zirconium solid solution 1#-1; | 0.142 | 76 | 40 | 623 | 591 |
| cerium-zirconium solid solution 1#-2 | 0.156 | 74 | 39 | 656 | 623 |
| cerium-zirconium solid solution 1#-3 | 0.162 | 78 | 41 | 618 | 603 |
| cerium-zirconium solid solution 1#-4 | 0.278 | 79 | 38 | 652 | 621 |
| cerium-zirconium solid solution 1#-5 | 0.397 | 77 | 37 | 599 | 576 |
| cerium-zirconium solid solution 1#-6 | 0.462 | 82 | 35 | 603 | 581 |
| cerium-zirconium solid solution 1#-7 | 0.668 | 85 | 30 | 578 | 556 |
| cerium-zirconium solid solution 1#-8 | 0.793 | 83 | 28 | 556 | 531 |
| cerium-zirconium solid solution 1#-9 | 0.021 | 84 | 31 | 612 | 582 |
| cerium-zirconium solid solution 2#-1; | 0.139 | 72 | 37 | 609 | 576 |
| cerium-zirconium solid solution 2#-2; | 0.161 | 71 | 37 | 597 | 569 |
| cerium-zirconium solid solution 2#-3; | 0.172 | 75 | 36 | 591 | 582 |

TABLE 3-continued

| Test number | $Ce^{3+}/Ce^{4+}$ | Specific surface area (m²/g) | Aging specific surface area (m²/g)(1100° C.-4 h) | Oxygen storage capacity/(μmol[O]/g) (treated at 750° C.-4 h) | Oxygen storage capacity/(μmol[O]/g) (treated at 1100° C.-4 h) |
|---|---|---|---|---|---|
| cerium-zirconium solid solution 2#-4; | 0.269 | 79 | 38 | 600 | 579 |
| cerium-zirconium solid solution 2#-5; | 0.406 | 76 | 35 | 587 | 576 |
| cerium-zirconium solid solution 2#-6; | 0.462 | 74 | 35 | 561 | 549 |
| cerium-zirconium solid solution 2#-7; | 0.650 | 74 | 31 | 546 | 534 |
| cerium-zirconium solid solution 2#-8; | 0.811 | 80 | 27 | 521 | 509 |
| cerium-zirconium solid solution 2#-9; | 0.032 | 86 | 35 | 615 | 587 |

It can be seen from Table 3 that cerium-zirconium solid solution 1 #-6 and cerium-zirconium solid solution 2 #-6 with the $Ce^{3+}/Ce^{4+}$ ratio between 0.1-0.5 have an oxygen storage capacity of not less than 561 μmol [O]/g after treatment at 750° C. for 4 hours; the specific surface area of cerium-zirconium solid solutions 1 #-6 and 2 #-6 treated at 1100° C. for 4 hours is not less than 35 m²/g. Cerium-zirconium solid solution 1 #-2 has an oxygen storage capacity of up to 656 μmol[O]/g after treatment at 750° C. for 4 hours; cerium-zirconium solid solution 1 #-1 has a specific surface area of up to 40 m²/g after treatment at 1100° C. for 4 hours. Cerium-zirconium solid solution 1 #-2 has an oxygen storage capacity of up to 623 μmol[O]/g after treatment at 1100° C. for 4 hours. Cerium-zirconium solid solution 1 #-6 and cerium-zirconium solid solution 2 #-6 with the ratio of $Ce^{3+}/Ce^{4+}$ between 0.1-0.5 show more excellent oxygen storage performance, indicating that they have more stable crystal structures.

Example 6 Preparation of Catalysts 1 #-1~1 #-9 and 2 #-1~2 #-9

The catalytically active component palladium is loaded on the cerium-zirconium solid solution 1 #-1~1 #-9, 2 #-1~2 #-9 using the equal volume impregnation method to obtain catalysts 1 #-1~1 #-9 and 2 #-1~2 #-9. Catalysts 1 #-1~1 #-9 and 2 #-1~2 #-9 have the same palladium loading of 1.5 wt %.

Taking cerium-zirconium solid solution 1 #-1 as an example to illustrate the specific loading method, which includes: using chloropalladium acid solution ($H_2PdCl_4$) as a precursor impregnating solution, impregnating and loading cerium-zirconium solid solution 1 #-1 with a loading amount of 1.5 wt %; drying the loaded slurry in a rotary evaporator, then drying in a blast drying oven at 110° C. for 3 hours, and calcining in a calcining furnace at 500° C. for 3 hours under an air atmosphere.

Example 7 Catalytic Performance Tests of Catalysts 1 #-1~1 #-9 and 2 #-1~2 #-9 for CO Taking points at 400° C. and testing the conversion rates of catalysts 1 #-1~1 #-9 and 2 #-1~2 #-9 for CO under different λ respectively as shown in Table 4. It can be seen from the data in Table 4 that when the ratio of $Ce^{3+}/Ce^{4+}$ is between 0.1-0.7, the catalyst has a high catalytic activity for CO; when the ratio of $Ce^{3+}/Ce^{4+}$ is between 0.1-0.5, the catalyst has a higher catalytic activity for CO; and the applicable λ range of the catalyst is wide.

TABLE 4

| Test number | $Ce^{3+}/Ce^{4+}$ | conversion rate of CO/% | | | | |
|---|---|---|---|---|---|---|
| | | λ = 1.1 | λ = 1.05 | λ = 1.0 | λ = 0.95 | λ = 0.9 |
| Catalyst 1#-1 | 0.142 | 85.6 | 84.5 | 85.0 | 82.7 | 78.5 |
| Catalyst 1#-2 | 0.156 | 91.8 | 90.5 | 89.6 | 88.6 | 84.9 |
| Catalyst 1#-3 | 0.162 | 97.2 | 96.4 | 96.0 | 95.8 | 92.8 |
| Catalyst 1#-4 | 0.278 | 98.6 | 97.1 | 96.8 | 95.3 | 93.4 |

TABLE 4-continued

| Test number | $Ce^{3+}/Ce^{4+}$ | conversion rate of CO/% | | | | |
|---|---|---|---|---|---|---|
| | | $\lambda = 1.1$ | $\lambda = 1.05$ | $\lambda = 1.0$ | $\lambda = 0.95$ | $\lambda = 0.9$ |
| Catalyst 1#-5 | 0.397 | 99.1 | 98.6 | 97.1 | 96.5 | 94.2 |
| Catalyst 1#-6 | 0.462 | 98.1 | 96.3 | 95.2 | 94.5 | 91.8 |
| Catalyst 1#-7 | 0.668 | 90.2 | 89.8 | 82.6 | 81.9 | 76.1 |
| Catalyst 1#-8 | 0.793 | 85.2 | 84.4 | 79.3 | 77.6 | 73.7 |
| Catalyst 1#-9 | 0.021 | 82.3 | 81.6 | 78.9 | 77.2 | 77.8 |
| Catalyst 2#-1 | 0.139 | 91.4 | 90.7 | 90.6 | 88.4 | 79.7 |
| Catalyst 2#-2 | 0.161 | 92.3 | 93.5 | 92.8 | 91.9 | 85.6 |
| Catalyst 2#-3 | 0.172 | 96.5 | 95.9 | 94.0 | 93.5 | 89.3 |
| Catalyst 2#-4 | 0.269 | 98.9 | 97.2 | 96.3 | 95.7 | 90.7 |
| Catalyst 2#-5 | 0.406 | 96.5 | 96.7 | 96.7 | 96.4 | 90.4 |
| Catalyst 2#-6 | 0.462 | 93.7 | 92.4 | 91.8 | 90.7 | 87.4 |
| Catalyst 2#-7 | 0.650 | 89.1 | 87.6 | 85.4 | 80.9 | 79.3 |
| Catalyst 2#-8 | 0.811 | 84.3 | 82.3 | 81.1 | 80.4 | 75.9 |
| Catalyst 2#-9 | 0.032 | 82.6 | 81.4 | 80.3 | 79.7 | 78.4 |

Example 8 Catalytic Performance Tests of Catalysts 1 #-1~1 #-9 and 2 #-1~2 #-9 for $C_2H_6$ Taking points at 400° C. and testing the conversion rates of catalysts 1 #-1~1 #-9 and 2 #-1~2 #-9 for $C_2H_6$ under different λ respectively as shown in Table 5. It can be seen from the data in Table 5 that when the ratio of $Ce^{3+}/Ce^{4+}$ is between 0.1-0.7, the catalyst has a high catalytic activity for $C_2H_6$; when the ratio of $Ce^{3+}/Ce^{4+}$ is between 0.1-0.5, the catalyst has a higher catalytic activity for $C_2H_6$; and the applicable λ range of the catalyst is wide.

TABLE 5

| Test number | $Ce^{3+}/Ce^{4+}$ | conversion rate of $C_2H_6$ | | | | |
|---|---|---|---|---|---|---|
| | | $\lambda = 1.1$ | $\lambda = 1.05$ | $\lambda = 1.0$ | $\lambda = 0.95$ | $\lambda = 0.9$ |
| Catalyst 1#-1 | 0.142 | 84.3 | 83.2 | 84.0 | 83.2 | 81.7 |
| Catalyst 1#-2 | 0.156 | 86.9 | 85.7 | 87.2 | 82.9 | 82.7 |
| Catalyst 1#-3 | 0.162 | 96.1 | 96.9 | 95.9 | 94.6 | 93.8 |
| Catalyst 1#-4 | 0.278 | 97.8 | 97.5 | 97.3 | 96.8 | 95.1 |
| Catalyst 1#-5 | 0.397 | 98.6 | 98.1 | 98.2 | 97.9 | 94.2 |
| Catalyst 1#-6 | 0.462 | 94.5 | 95.0 | 94.5 | 93.8 | 91.8 |
| Catalyst 1#-7 | 0.668 | 86.4 | 86.4 | 85.3 | 83.1 | 91.8 |
| Catalyst 1#-8 | 0.793 | 82.2 | 81.8 | 80.6 | 79.2 | 74.2 |
| Catalyst 1#-9 | 0.021 | 75.2 | 74.1 | 73.4 | 73.7 | 72.4 |
| Catalyst 2#-1 | 0.139 | 85.0 | 84.3 | 83.0 | 81.5 | 81.9 |
| Catalyst 2#-2 | 0.161 | 87.4 | 85.7 | 85.2 | 83.1 | 83.5 |
| Catalyst 2#-3 | 0.172 | 96.4 | 97.2 | 96.4 | 93.9 | 94.1 |
| Catalyst 2#-4 | 0.269 | 97.1 | 97.6 | 97.7 | 97.1 | 95.7 |
| Catalyst 2#-5 | 0.406 | 98.9 | 99.5 | 98.2 | 98.1 | 93.7 |
| Catalyst 2#-6 | 0.462 | 95.2 | 94.8 | 94.9 | 94.6 | 91.7 |
| Catalyst 2#-7 | 0.650 | 86.6 | 87.1 | 84.8 | 83.5 | 92.1 |
| Catalyst 2#-8 | 0.811 | 83.1 | 82.8 | 81.6 | 79.7 | 74.8 |
| Catalyst 2#-9 | 0.032 | 77.6 | 76.4 | 75.3 | 74.8 | 73.7 |

Example 9 Catalytic Performance Tests of Catalysts 1 #-1~1 #-8 and 2 #-1~2 #-8 for $NO_2$ Taking points at 400° C. and testing the conversion rates of catalysts 1 #-1~1 #-9 and 2 #-1~2 #-9 for $NO_2$ under different λ respectively as shown in Table 6. It can be seen from the data in Table 6 that when the ratio of $Ce^{3+}/Ce^{4+}$ is between 0.1-0.7, the catalyst has a high catalytic activity for $NO_2$; when the ratio of $Ce^{3+}/Ce^{4+}$ is between 0.1-0.5, the catalyst has a higher catalytic activity for $NO_2$; and the applicable λ range of the catalyst is wide.

TABLE 6

| Test number | $Ce^{3+}/Ce^{4+}$ | conversion rate of $NO_2$ | | | | |
|---|---|---|---|---|---|---|
| | | $\lambda = 1.1$ | $\lambda = 1.05$ | $\lambda = 1.0$ | $\lambda = 0.95$ | $\lambda = 0.9$ |
| Catalyst 1#-1 | 0.142 | 66.3 | 70.2 | 73.6 | 78.7 | 85.4 |
| Catalyst 1#-2 | 0.156 | 67.4 | 72.2 | 75.2 | 80.9 | 89.7 |
| Catalyst 1#-3 | 0.162 | 79.5 | 81.3 | 84.8 | 86.4 | 93.6 |
| Catalyst 1#-4 | 0.278 | 85.6 | 87.6 | 89.5 | 94.3 | 97.4 |
| Catalyst 1#-5 | 0.397 | 87.8 | 87.4 | 88.9 | 94.9 | 98.2 |
| Catalyst 1#-6 | 0.462 | 84.7 | 83.1 | 87.4 | 92.7 | 97.8 |
| Catalyst 1#-7 | 0.668 | 77.5 | 76.5 | 79.8 | 85.3 | 87.4 |
| Catalyst 1#-8 | 0.793 | 74.6 | 73.8 | 76.5 | 78.9 | 82.6 |
| Catalyst 1#-9 | 0.021 | 62.1 | 69.7 | 71.4 | 75.6 | 85.2 |
| Catalyst 2#-1 | 0 | 67.5 | 71.7 | 74.6 | 79.7 | 87.2 |
| Catalyst 2#-2 | 0.139 | 68.5 | 73.2 | 76.7 | 83.9 | 90.7 |
| Catalyst 2#-3 | 0.161 | 80.1 | 84.3 | 85.9 | 88.2 | 95.8 |
| Catalyst 2#-4 | 0.172 | 83.6 | 90.1 | 90.1 | 96.1 | 98.4 |
| Catalyst 2#-5 | 0.269 | 89.8 | 88.7 | 92.3 | 95.1 | 99.3 |
| Catalyst 2#-6 | 0.406 | 84.9 | 83.4 | 87.7 | 93.6 | 96.6 |
| Catalyst 2#-7 | 0.462 | 77.8 | 77.3 | 82.4 | 87.1 | 92.1 |
| Catalyst 2#-8 | 0.650 | 64.4 | 69.4 | 75.4 | 79.6 | 88.7 |
| Catalyst 2#-9 | 0.032 | 75.2 | 74.3 | 73.6 | 72.1 | 70.8 |

Example 10 Preparation of Aged Catalysts 1 #-1~1 #-8

After aging cerium-zirconium solid solutions 1 #-1~1 #-8 at 1100° C. for 4 hours, aged cerium-zirconium solid solutions 1 #-1~1 #-8 are obtained. Aged catalysts 1 #-1~1 #-8 are obtained by loading the same amount of palladium on aged cerium-zirconium solid solutions 1 #-1~1 #-8 using the loading method of Example 6.

Example 11 Catalytic Performance Tests of Aged Catalysts 1 #-1~1 #-8 for $NO_2$

Taking points at 400° C. The conversion rates of aged catalysts 1 #-1~1 #-8 for $NO_2$ under different λ respectively are as shown in Table 7. It can be seen from the data in Table 7 that when the ratio of $Ce^{3+}/Ce^{4+}$ is between 0.1-0.7, the aged catalysts 1 #-1~1 #-8 have a high catalytic activity for $NO_2$; when the ratio of $Ce^{3+}/Ce^{4+}$ is between 0.1-0.5, the aged catalysts 1 #-1~1 #-8 have a higher catalytic activity for $NO_2$, indicating that when the ratio of $Ce^{3+}/Ce^{4+}$ is between 0.1-0.5, they show better structural stability.

TABLE 7

| Test number | $Ce^{3+}/Ce^{4+}$ | conversion rate of $NO_2$ | | | | |
|---|---|---|---|---|---|---|
| | | $\lambda = 1.1$ | $\lambda = 1.05$ | $\lambda = 1.0$ | $\lambda = 0.95$ | $\lambda = 0.9$ |
| Aged catalyst 1#-1 | 0.142 | 60.8 | 64.4 | 66.7 | 70.1 | 75.2 |
| Aged catalyst 1#-2 | 0.156 | 61.3 | 63.6 | 67.9 | 72.3 | 76.4 |
| Aged catalyst 1#-3 | 0.162 | 73.4 | 74.2 | 77.8 | 78.5 | 79.2 |
| Aged catalyst 1#-4 | 0.278 | 75.7 | 76.8 | 77.8 | 77.3 | 80.2 |
| Aged catalyst 1#-5 | 0.397 | 74.8 | 79.5 | 82.5 | 86.9 | 92.7 |
| Aged catalyst 1#-6 | 0.462 | 75.9 | 80.1 | 83.7 | 88.7 | 93.6 |
| Aged catalyst 1#-7 | 0.668 | 72.3 | 77.6 | 78.9 | 82.3 | 85.7 |
| Aged catalyst 1#-8 | 0.793 | 70.6 | 72.8 | 74.8 | 75.9 | 78.9 |
| Aged catalyst 1#-9 | 0.021 | 62.7 | 63.8 | 62.7 | 64.9 | 69.7 |

What is claimed is:

1. A cerium-zirconium solid solution, comprising a cerium-zirconium solid solution phase, wherein the cerium-zirconium solid solution phase comprises trivalent cerium ions and tetravalent cerium ions, a molar ratio of the trivalent cerium ions to the tetravalent cerium ions being 0.05-0.8:1;
wherein the cerium-zirconium solid solution comprises a cerium oxide, $ZrO_2$, and a first rare earth element oxide in a weight ratio of 20-50:20-80:2-20;
wherein the first rare earth element is selected from at least one of rare earth elements other than cerium, transition metal elements, and alkaline earth metal elements;
wherein the cerium-zirconium solid solution further comprises a second rare earth element oxide.

2. The cerium-zirconium solid solution according to claim 1, wherein the molar ratio of the trivalent cerium ions to the tetravalent cerium ions is 0.1-0.5:1.

3. The cerium-zirconium solid solution according to claim 1, wherein the first rare earth element is selected from at least one of lanthanum, yttrium, praseodymium, neodymium, and samarium.

4. The cerium-zirconium solid solution according to claim 1, wherein the weight ratio of the cerium oxide to the second rare earth oxide being 20-50:2-5;
wherein the second rare earth element is selected from at least one of promethium, samarium, europium, gadolinium, terbium, dysprosium, holmium, erbium, thulium, ytterbium, lutetium, and scandium.

5. The cerium-zirconium solid solution according to claim 1, wherein the cerium-zirconium solid solution comprises the cerium oxide, $ZrO_2$, the first rare earth element oxide, and the second rare earth element oxide in a weight ratio of 25-45:30-70: 3-15:2-4.

6. The cerium-zirconium solid solution according to claim 1, wherein after calcination at 850° C. for 4 hours, an oxygen storage capacity of the cerium-zirconium solid solution is not less than 540 μmol [O]/g; and/or
a specific surface area of the cerium-zirconium solid solution treated at 1100° C. for 4 hours is not less than 30 m²/g.

7. A preparation method for the cerium-zirconium solid solution according to claim 1, comprising the following steps:
1) mixing: preparing an initial mixture of an aqueous solution containing trivalent cerium ions and zirconium ions;
2) oxidation reaction: adding hydrogen peroxide to the acidic initial mixture according to a required amount of trivalent cerium ions and tetravalent cerium ions, and adding a precipitant to adjust pH of the solution to 10-11 to obtain a precursor solution;
3) a first hydrothermal reaction: after the first hydrothermal reaction, calcining the precursor solution in an inert gas to obtain the cerium-zirconium solid solution.

8. The preparation method for the cerium-zirconium solid solution according to claim 7, wherein the mixing in the step 1) comprises the step of: preparing an initial mixture of an aqueous solution containing trivalent cerium ions, zirconium ions and M ions;
wherein the M element is selected from at least one of rare earth elements other than cerium, transition metal elements, and alkaline earth metal elements.

9. The preparation method for the cerium-zirconium solid solution according to claim 7, wherein the step 2) comprises the following steps:
① adding an alkaline precipitant to the initial mixture until the pH of the solution is 1.0-2.5; adding 30% of an aqueous solution of hydrogen peroxide to the acidic initial mixture according to the amount of trivalent cerium ions and tetravalent cerium ions, and stirring at least 1 hour for a second hydrothermal reaction; and
② adding a precipitant to adjust the pH of the solution to 10-11, and aging the solution for at least 1 hour to obtain the precursor solution.

10. The preparation method for the cerium-zirconium solid solution according to claim 7, wherein a calcining condition in the step 3) is calcining in an inert gas at 750° C.-850° C. for 4 hours.

11. The preparation method for the cerium-zirconium solid solution according to claim 7, wherein the cerium-zirconium solid solution comprises 20 wt %-60 wt % cerium oxide and 35 wt %-60 wt % $ZrO_2$, and the cerium oxide comprises trivalent cerium ions and tetravalent cerium ions in a molar ratio of 0.05-0.7:1.

12. A catalyst, comprising a cerium-zirconium solid solution, wherein the cerium-zirconium solid solution is selected from:
the cerium-zirconium solid solution according to claim 1, or
the cerium-zirconium solid solution according to claim 1 calcined at 500-1200° C. for at least 1 hour.

13. A catalyst, comprising a cerium-zirconium solid solution, wherein the cerium-zirconium solid solution is selected from:
the cerium-zirconium solid solution prepared by the method according to claim 7, or
the cerium-zirconium solid solution prepared by the method according to claim 7 calcined at 500-1200° C. for at least 1 hour.

14. An application of the cerium-zirconium solid solution according to claim 1, wherein the application is selected from any one of I or II:
I. an application in catalytic conversion of one or more gases selected from $CH_4$, $C_3H_8$, $C_2H_6$, $NO_2$, NO, CO, $H_2O$ or $CO_2$,
II. an application in mobile source tail gas, waste gas treatment, natural gas catalytic combustion, organic waste gas purification or industrial waste gas denitration treatment.

15. An application of the catalyst according to claim 12, wherein the application is selected from any one of I or II:
I. an application in catalytic conversion of one or more gases selected from $CH_4$, $C_3H_8$, $C_2H_6$, $NO_2$, NO, CO, $H_2O$ or $CO_2$,
II. an application in mobile source tail gas, waste gas treatment, natural gas catalytic combustion, organic waste gas purification or industrial waste gas denitration treatment.

* * * * *